United States Patent
Su

(10) Patent No.: US 12,220,944 B2
(45) Date of Patent: Feb. 11, 2025

(54) AUTOMATIC SPEED REDUCING WHEEL

(71) Applicant: Chien-Chung Su, Taichung (TW)

(72) Inventor: Chien-Chung Su, Taichung (TW)

( * ) Notice: Subject to any disclaimer, the term of this patent is extended or adjusted under 35 U.S.C. 154(b) by 383 days.

(21) Appl. No.: 17/890,786

(22) Filed: Aug. 18, 2022

(65) Prior Publication Data
US 2024/0059098 A1 Feb. 22, 2024

(51) Int. Cl.
*B60B 33/00* (2006.01)
*A61G 5/10* (2006.01)
*A61H 3/04* (2006.01)

(52) U.S. Cl.
CPC ...... *B60B 33/0094* (2013.01); *B60B 33/0028* (2013.01); *A61G 5/1008* (2013.01); *A61H 3/04* (2013.01); *A61H 2201/1463* (2013.01)

(58) Field of Classification Search
CPC ........ A61G 5/1008; A61H 3/04; F16D 59/00; B60B 33/0086; B60B 33/0094
USPC .................. 188/1.12, 2 F, 19, 39, 69, 85
See application file for complete search history.

(56) References Cited

U.S. PATENT DOCUMENTS

| | | | | |
|---|---|---|---|---|
| 3,623,575 A * | 11/1971 | Joseph | ....................... | B62B 5/04 188/134 |
| 4,629,036 A * | 12/1986 | Choy | .................... | B60B 33/021 188/177 |
| 5,371,922 A * | 12/1994 | Chern | ................. | B60B 33/0086 16/35 R |
| 5,839,546 A * | 11/1998 | Yan | ......................... | B60T 1/005 188/69 |
| 5,845,746 A * | 12/1998 | Henrickson | .......... | A61G 5/1054 188/26 |
| 6,382,364 B1 * | 5/2002 | Chuang | ................. | B60B 33/021 188/19 |
| 6,899,212 B2 * | 5/2005 | Li | ......................... | F16D 41/088 188/177 |
| 10,857,048 B2 * | 12/2020 | You | .......................... | B60T 7/12 |
| 2016/0164371 A1 * | 6/2016 | Rodger | ................. | F16C 39/066 310/90.5 |

* cited by examiner

*Primary Examiner* — Nicholas J Lane
(74) *Attorney, Agent, or Firm* — Muncy, Geissler, Olds & Lowe, P.C.

(57) ABSTRACT

An automatic speed reducing wheel includes a wheel unit and a speed reducing unit. The wheel unit includes a wheel seat, a wheel axle passing through the wheel seat, and a roller rotating about the wheel axle. A plurality of blockers is disposed on one side of the wheel frame in adjacent to an edge thereof in a radiation shape arrangement. The blockers rotate along with the roller. The speed reducing unit includes a fixing seat and a sliding member. The fixing seat is on one side of the roller and includes a sliding bore. The sliding member is slidably disposed in the sliding bore and includes an elastic portion having a blocking portion. When the roller moves downhill, the blocking portion of the sliding member protrudes out of an outer side of the sliding bore to interrupt a rotation route of the blockers, achieving a speed reducing effect.

9 Claims, 13 Drawing Sheets

AUTOMATIC SPEED REDUCING WHEEL

BACKGROUND OF THE INVENTION

1. Field of the Invention

The present invention relates to wheels, and more particularly, to a wheel automatically reducing the speed when moving downhill.

2. Description of the Related Art

Taiwan has entered an aging society which increasingly needs long-term care service. In hospitals or nursing organizations, patients or elder people often face inconvenience of moving due to physical disabilities or body weakness, and they have to rely on walkers or wheelchairs for facilitate their movement and outdoor activities. Therefore, use of walkers or wheelchairs accordingly increases.

Both walkers and wheelchairs are usually provided with wheels, which roll along the ground surface. However, when the walker or wheelchair is applied to move downhill, a sudden acceleration occurs due to the sliding force, resulting in the overspeed of the wheels. In this case, the user is usually unable to immediately respond, failing to control the brake mechanism for stopping the wheel in time, such that the user easily falls, or suffers from the accidental overturn of the walker or wheelchair, which poses high risks to the weak, the elder, or the disabled with weaker controlling capability. It is desirable to resolve such issues.

SUMMARY OF THE INVENTION

For improving the issues of the conventional wheels, the present invention, based on the idea of creation through various discussions, trial sample tests, revisions, and improvements, discloses an automatic speed reducing wheel.

The present invention provides an automatic speed reducing wheel, comprising:
   a wheel unit having a wheel seat, a wheel axle passing through the wheel seat, and a roller rotating about the wheel axle, the wheel seat comprising a through hole through which the wheel axle passes, the wheel axle comprising a non-circular section on one end thereof, the roller comprising a wheel frame whose outer periphery is combined with an outer wheel, the wheel frame comprising an axle bore passing through a center thereof, the wheel axle passing through the axle bore, the roller being configured to freely rotate about the wheel axle, a plurality of blockers disposed on one side of the wheel frame in adjacent to an edge thereof in a radiation shape arrangement, the plurality of blockers rotating along with the roller; and
   a speed reducing unit comprising a fixing seat and a sliding member, the fixing seat comprising a fixing bore and a sliding bore, the fixing bore mounted around the non-circular section of the wheel axle and fixed thereon, the fixing seat located on one side of the roller, the sliding member slidably disposed in the sliding bore, the sliding member comprising a sliding body, the sliding body comprising an elastic portion connected with a front end thereof, the elastic portion comprising a blocking portion connected with a front end thereof; when the roller moves downhill, the sliding bore slants downward by an inclination angle, and the sliding member slides along the sliding bore due to a gravity force, such that the blocking portion of the sliding member protrudes out of an outer side of the sliding bore to interrupt a rotation route of the blockers, whereby the blockers pass and hit the blocking portion one by one, such that a cooperation between the blocking portion and an elasticity of the elastic portion achieves a speed reducing effect.

When the roller moves downhill, the automatic speed reducing wheel of the present invention provides an automatic speed reducing function to avoid a sudden acceleration, thereby preventing the user from injury and increasing the safety of the user.

DETAILED DESCRIPTION OF THE INVENTION

Figure 1:
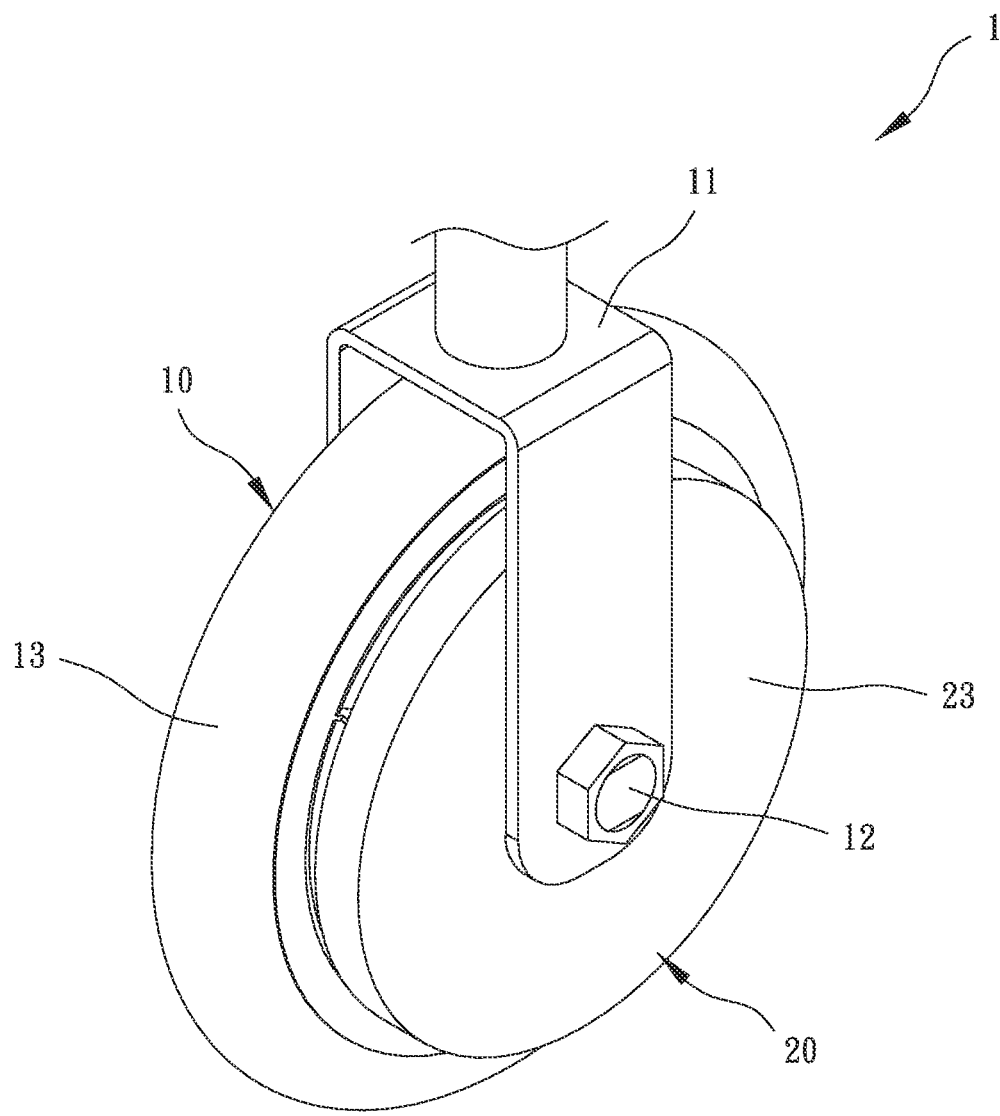
FIG. 1 is a perspective view in accordance with an embodiment of the present invention.
Figure 2:
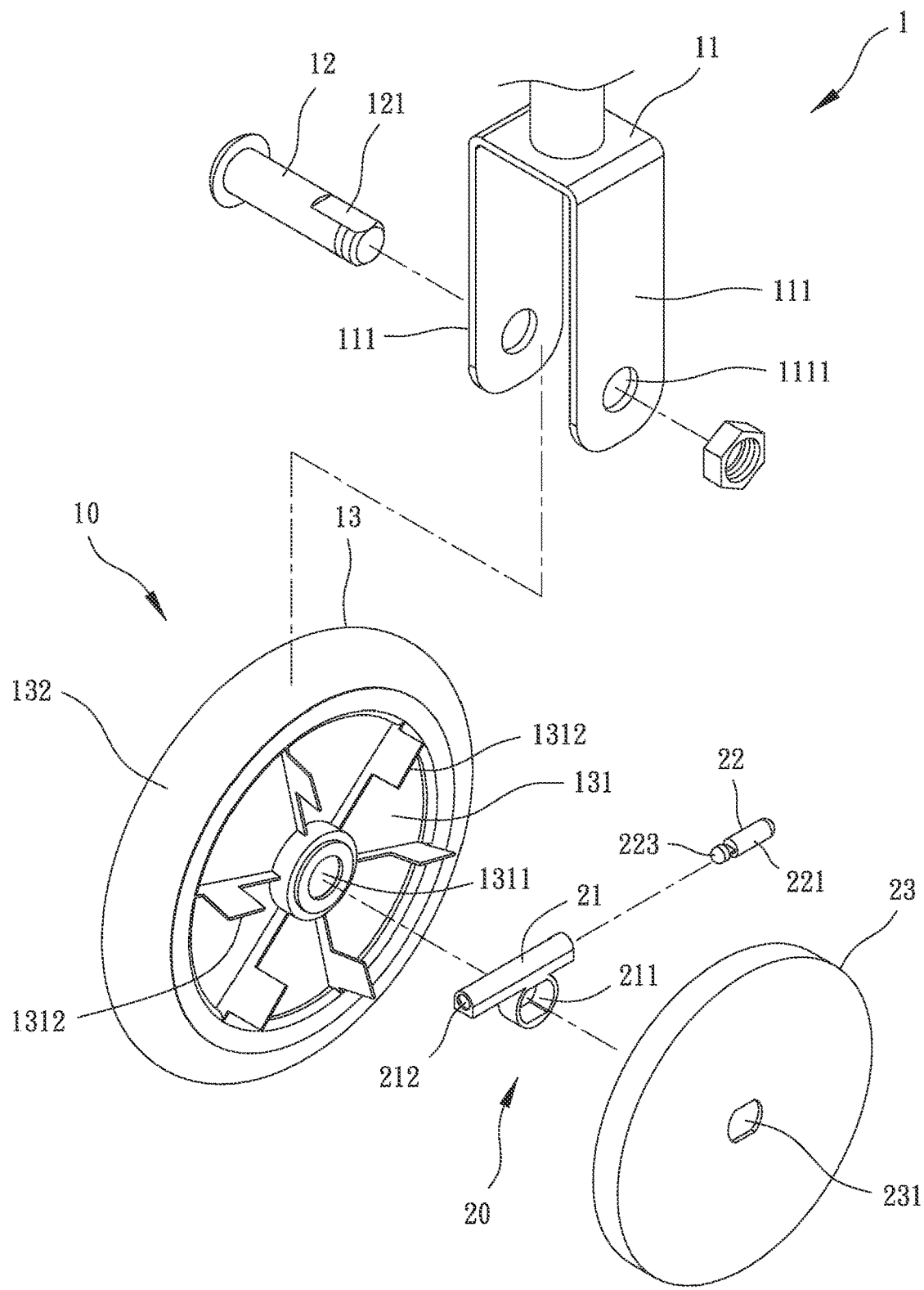
FIG. 2 is an exploded view of the present invention.
Figure 3:
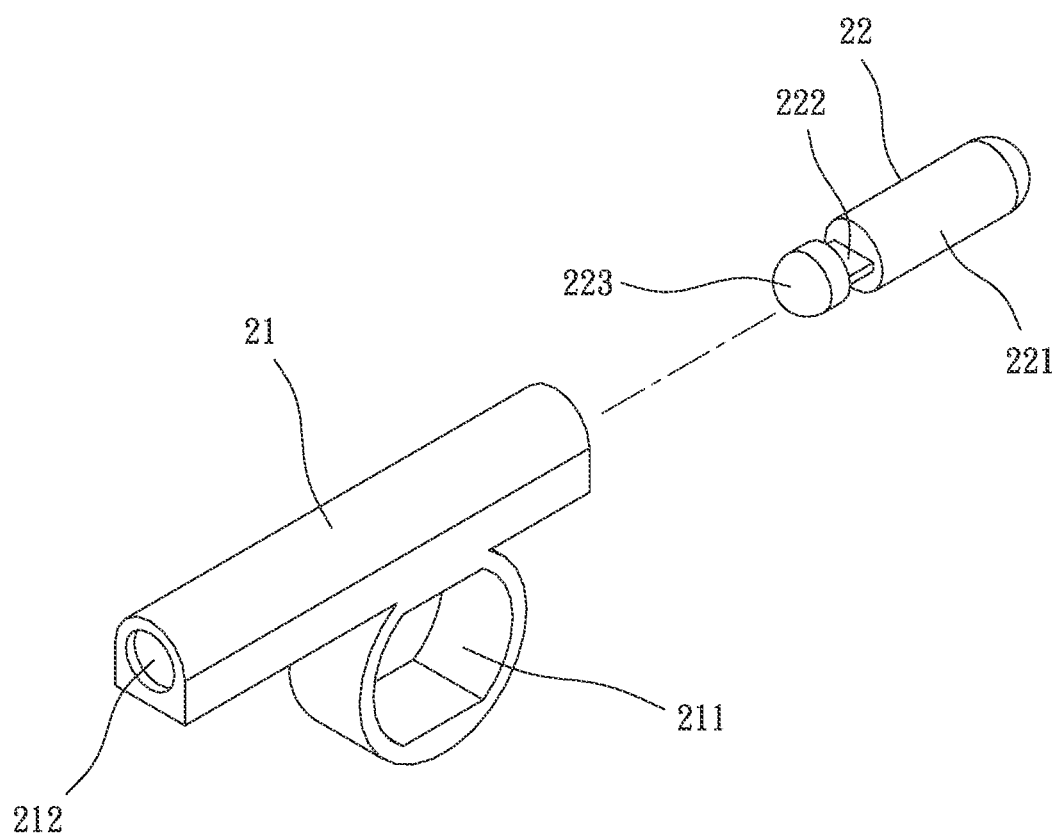
FIG. 3 is a perspective view of the fixing seat and the sliding member of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

The following content is illustrated in conjunction with the drawings of the preferable embodiments of the present invention, so as to enable people skilled in the art of the present invention to implement the present invention according to the specification.

Referring to FIG. 1 to FIG. 4, the automatic speed reducing wheel 1 of the present invention comprises a wheel unit 10 and a speed reducing unit 20.

The wheel unit 10 comprises a wheel seat 11, a wheel axle 12 passing through the wheel seat 11, and a roller 13 rotating about the wheel axle 12. Two side boards 111 extend from the wheel seat 11, and a through hole 1111 pass through the two side boards 111, such that the wheel axle 12 passes through the through hole 1111. The wheel axle 12 comprises a non-circular section 121 on one end thereof. The roller 13 is disposed between the two side boards 111. The roller 13 comprises a wheel frame 131 whose outer periphery is combined with an outer wheel 132. The wheel frame 131 comprises an axle bore 1311 passing through the center thereof. The wheel axle 12 passes through the axle bore 1311. Therefore, the roller 13 is configured to freely rotate about the wheel axle 12. A plurality of blockers 1312 is circularly disposed on one side of the wheel frame 131 in adjacent to an edge thereof in a radiation shape arrangement. The plurality of blockers 1312 rotates along with the roller 13.

The speed reducing unit 20 comprises a fixing seat 21, a sliding member 22, and a protection cover 23. The fixing seat 21 is disposed between the two side boards 111 and is arranged on one side of the roller 13. The fixing seat 21 comprises a fixing bore 211 and a sliding bore 212. The fixing bore 211 is mounted around the non-circular section 121 of the wheel axle 12 and fixed thereon. The sliding bore 212 is normally positioned in a horizontal arrangement. The sliding member 22 is slidably disposed in the sliding bore 212, such that the sliding member 22 is able to slide along the sliding bore 212. The sliding member 22 comprises a sliding body 221. The sliding body 221 comprises a sheet shaped elastic portion 222 connected with a front end of the sliding body 221. The elastic portion 222 comprises a blocking portion 223 connected with a front end of the elastic portion 222. The protection cover 23 is disposed between the two side boards 111 of the wheel seat 11 and is arranged on one side of the roller 13. The protection cover 23 covers the fixing seat 21 and the sliding member 22. The protection cover 23 comprises a combination bore 231 passing through the center thereof, such that the combination bore 231 is mounted around the non-circular section 121 and fixed thereon.

Figure 4:
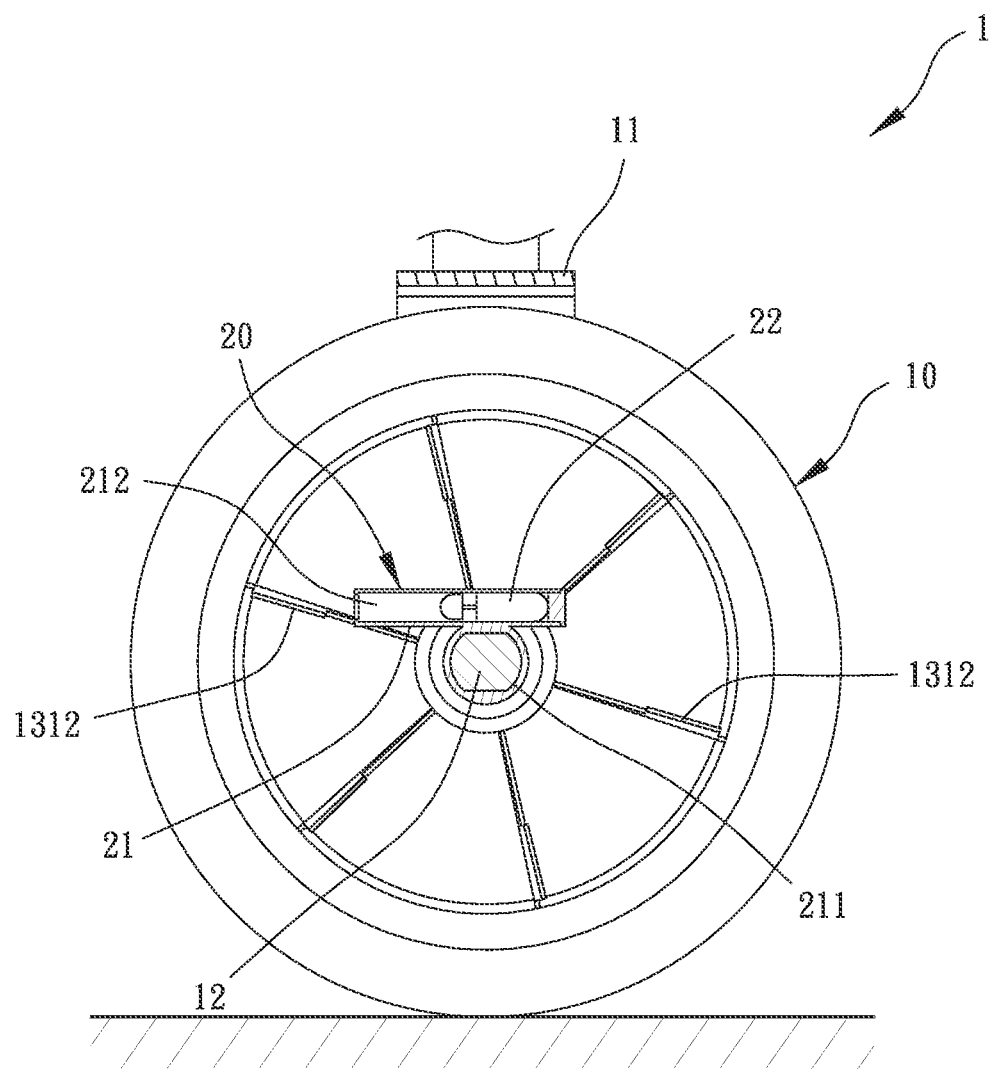
FIG. 4 is a sectional view of the present invention.
Figure 5:
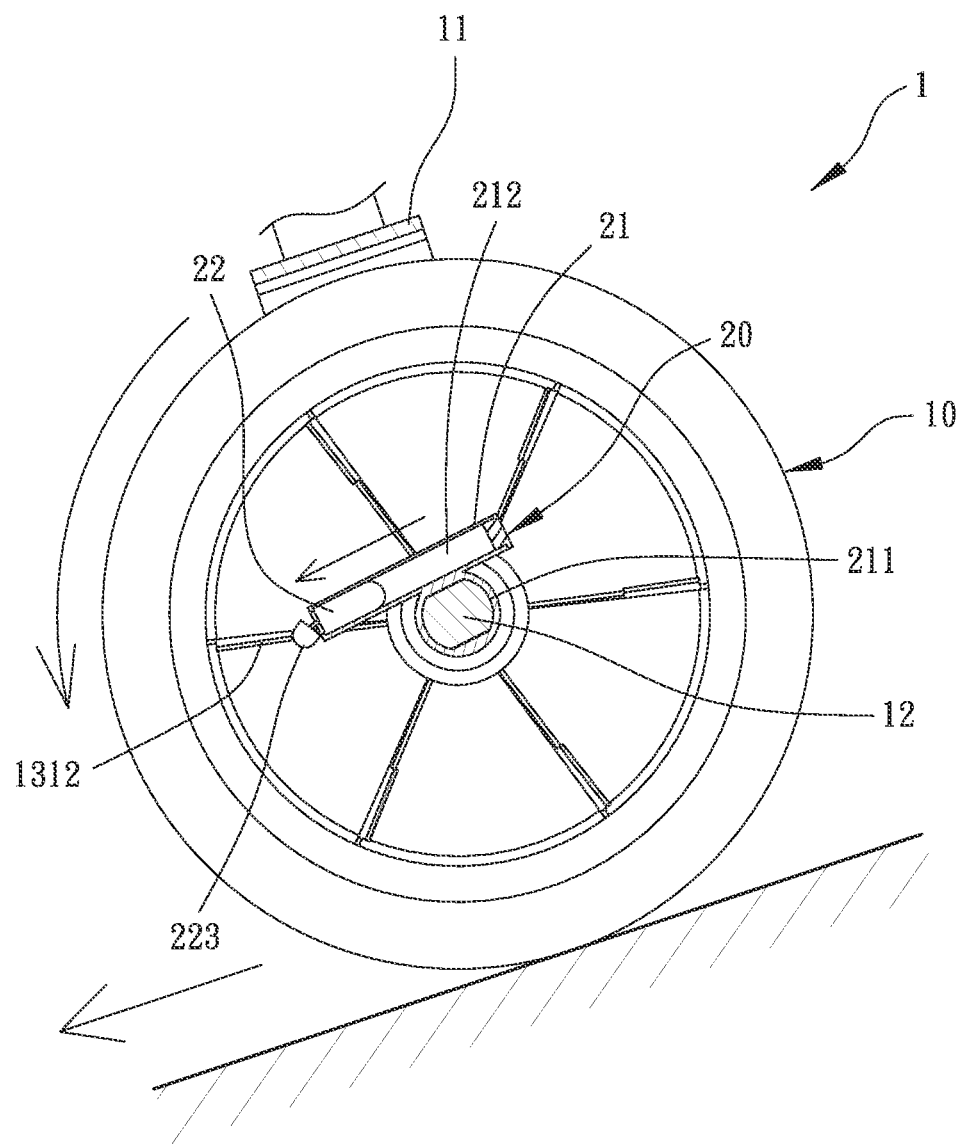
FIG. 5 is a schematic view illustrating the automatic speed reducing operation when moving downhill.
Figure 6:
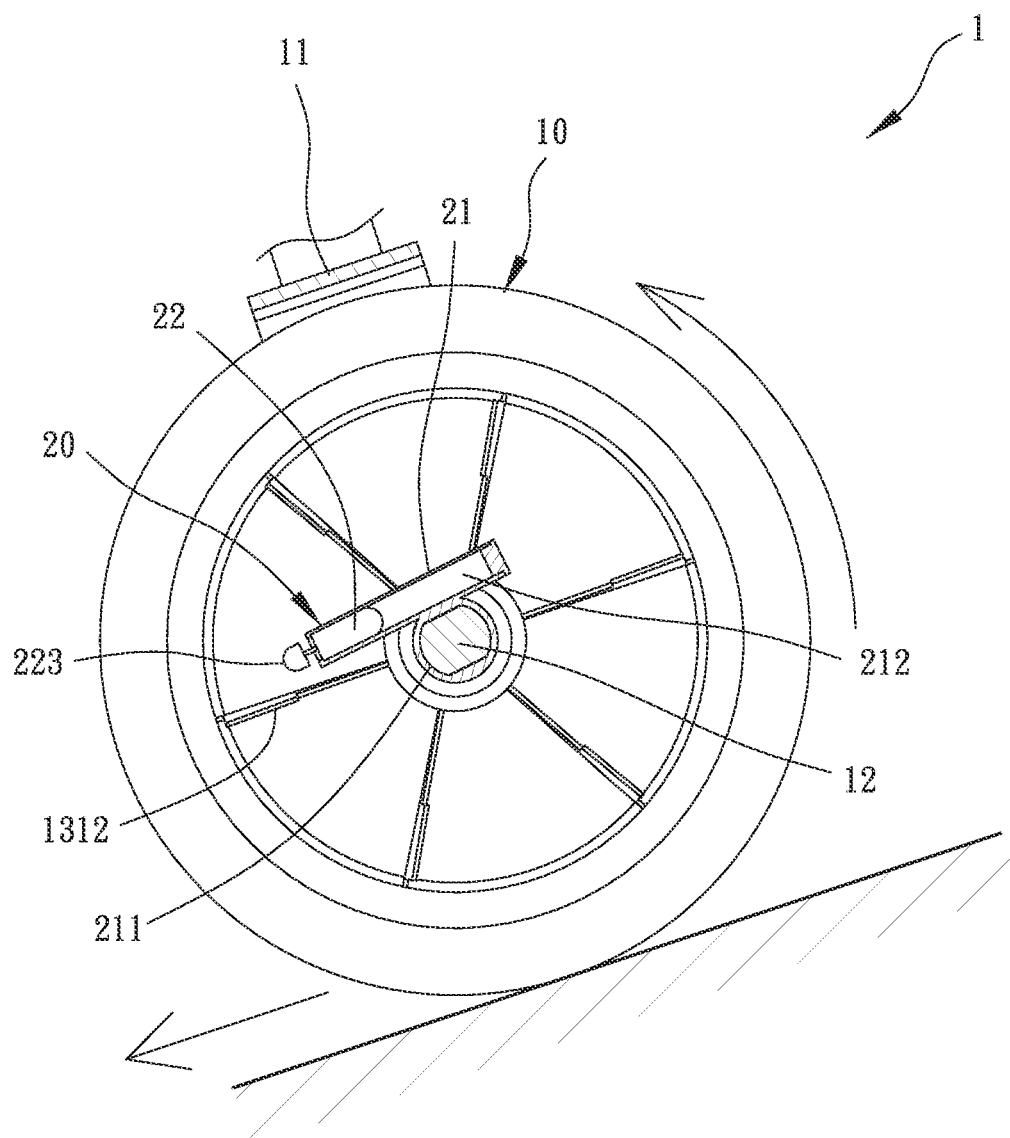
FIG. 6 is another schematic view illustrating the automatic speed reducing operation when moving downhill.
Figure 7:
FIG. 7 is a schematic view illustrating the usage of the present invention installed on a wheelchair.
Figure 8:
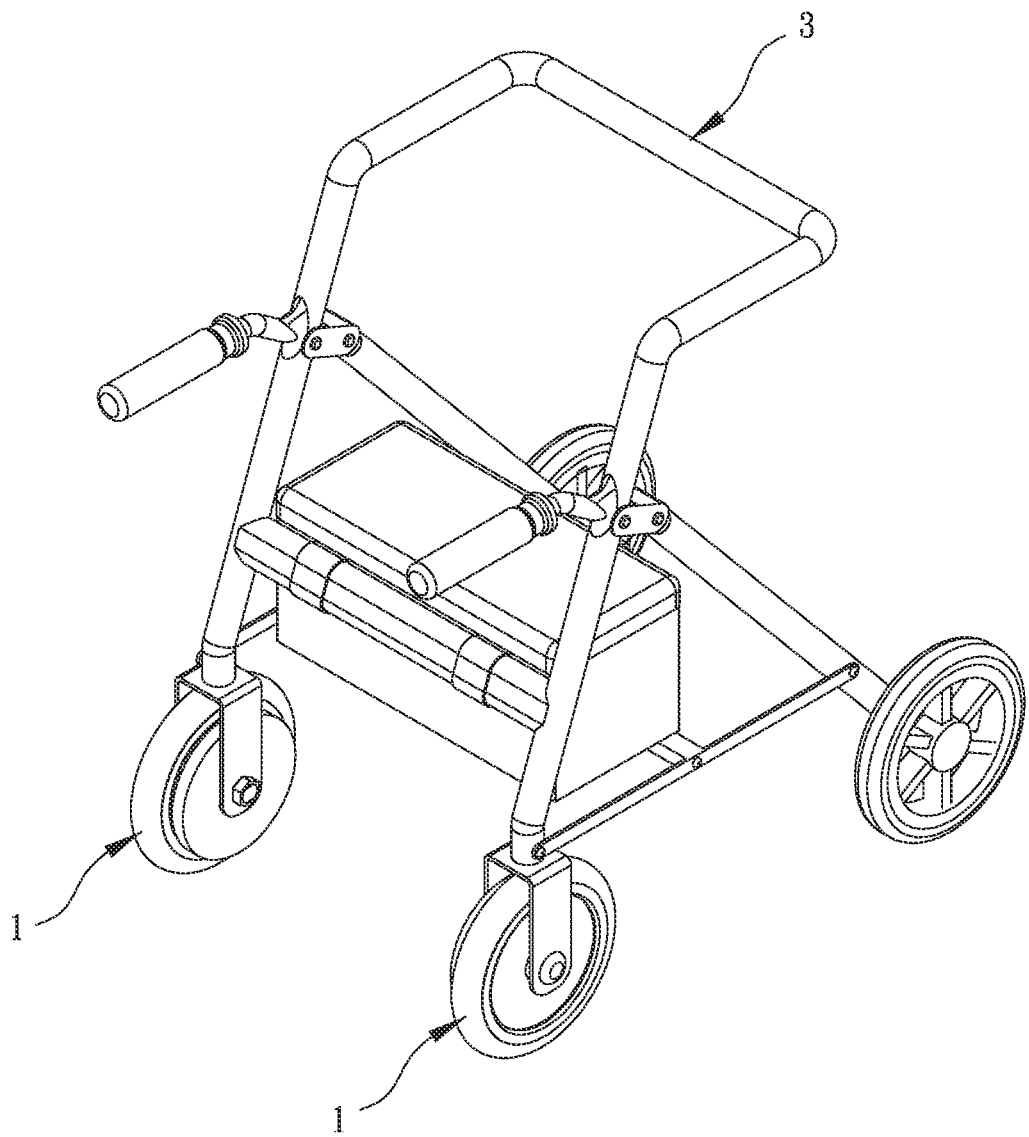
FIG. 8 is a schematic view illustrating the usage of the present invention installed on a mobility aid.

In use, the automatic speed reducing wheel 1 is able to be installed on a moving vehicle such as a wheelchair 2 (as shown by FIG. 7) or a mobility aid 3 (as shown by FIG. 8). When the wheelchair 2 or the mobility aid 3 move on a level ground, the blocking portion 223 of the sliding member 22 is away from the rotation route of the plurality of blockers 1312 (as shown by FIG. 4), so that the wheelchair 2 or the mobility aid 3 is able to normally move. Referring to FIG. 5 and FIG. 6, when the wheelchair 2 or the mobility aid 3 moves downhill, the sliding bore 212 slants downward by an inclination angle. The sliding member 22 slides along the sliding bore 212 due to the effect of the gravity force, such that the blocking portion 223 of the sliding member 22 protrudes out of an outer side of the sliding bore 212 to interrupt the rotation route of the plurality of blockers 1312, whereby the blocking portion 223 hinders the rotation of the blockers 1312 with the elastic deformation and resilience of the elastic portion 222, so that the plurality of blockers 1312 passes and hits the blocking portion 223 one by one, achieving a speed reducing effect.

Figure 9:
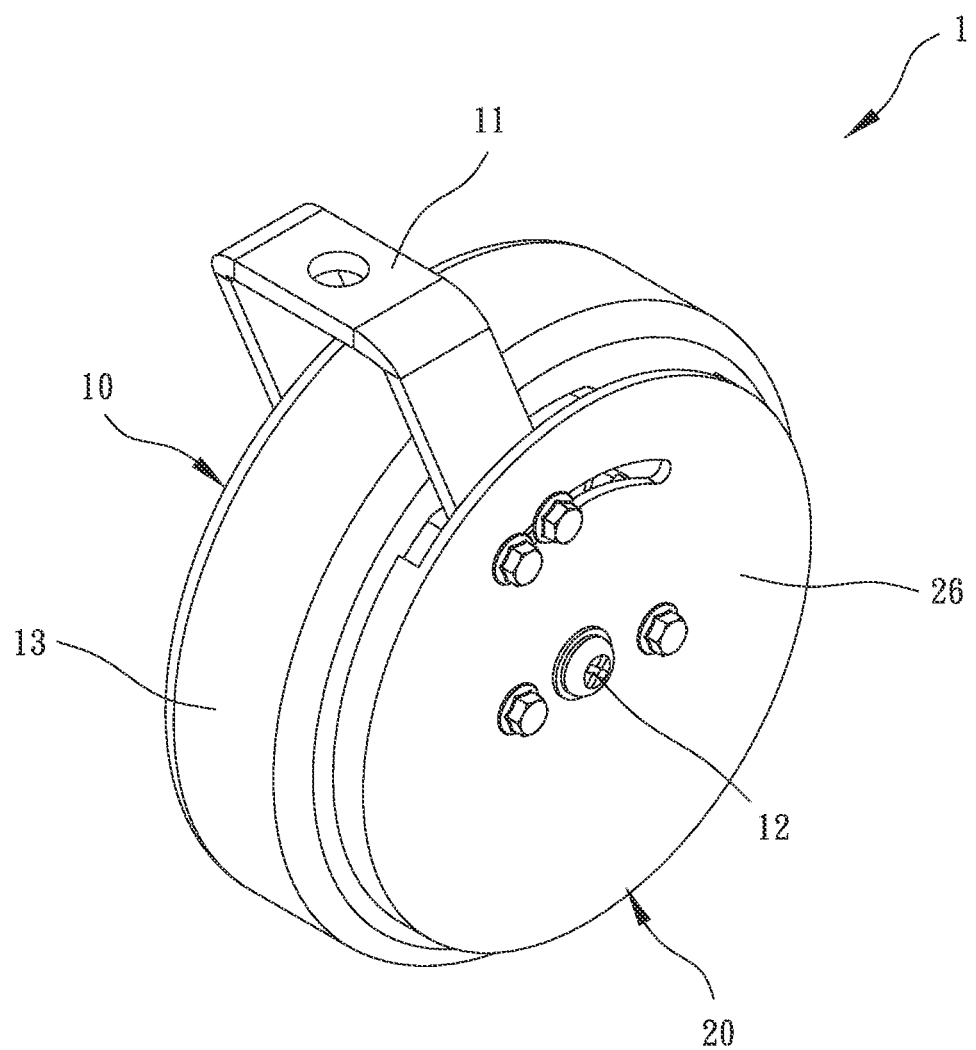
FIG. 9 is a perspective view in accordance with another embodiment of the present invention.
Figure 10:
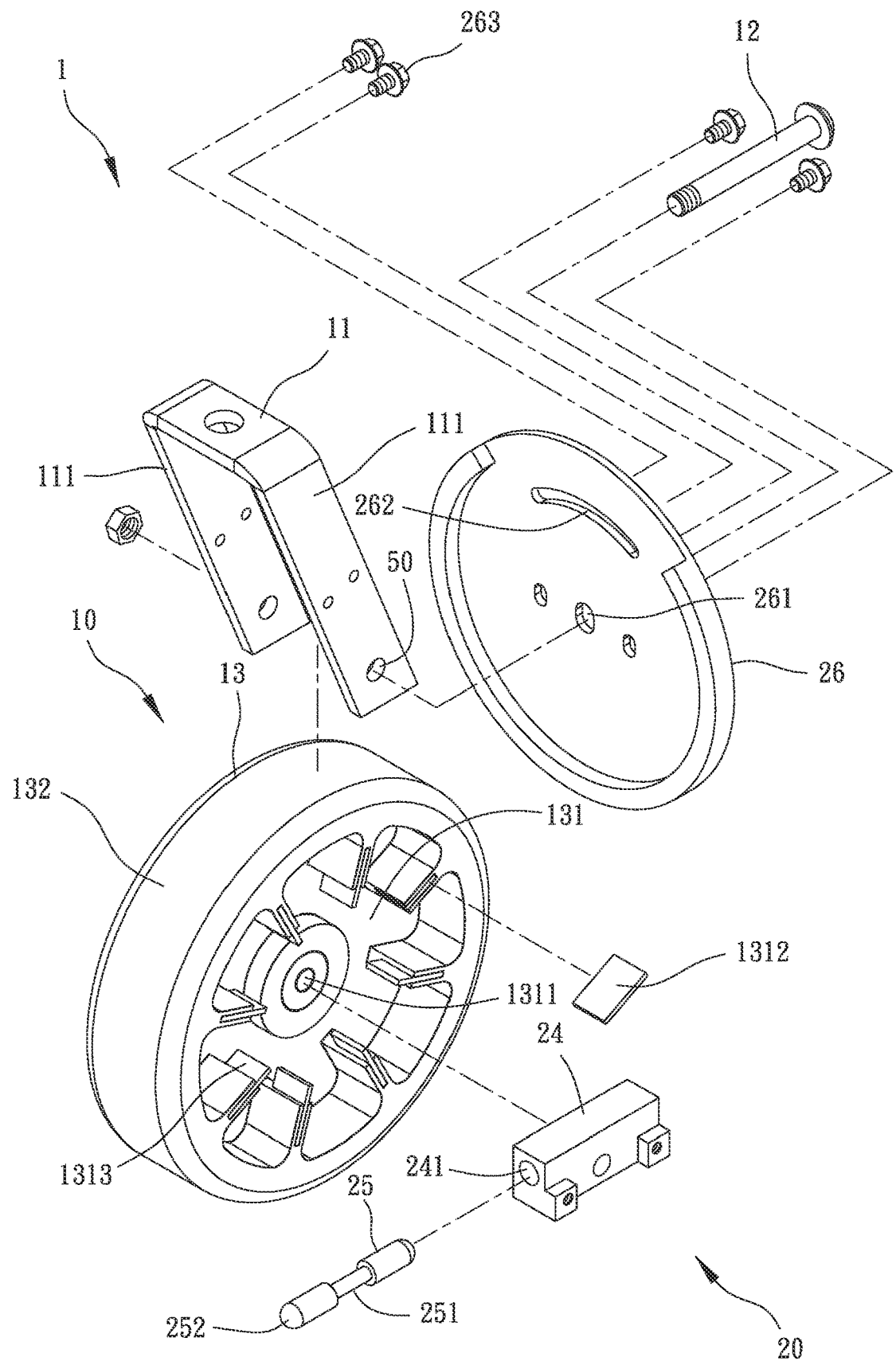
FIG. 10 is an exploded view in accordance with another embodiment of the present invention.
Figure 11:
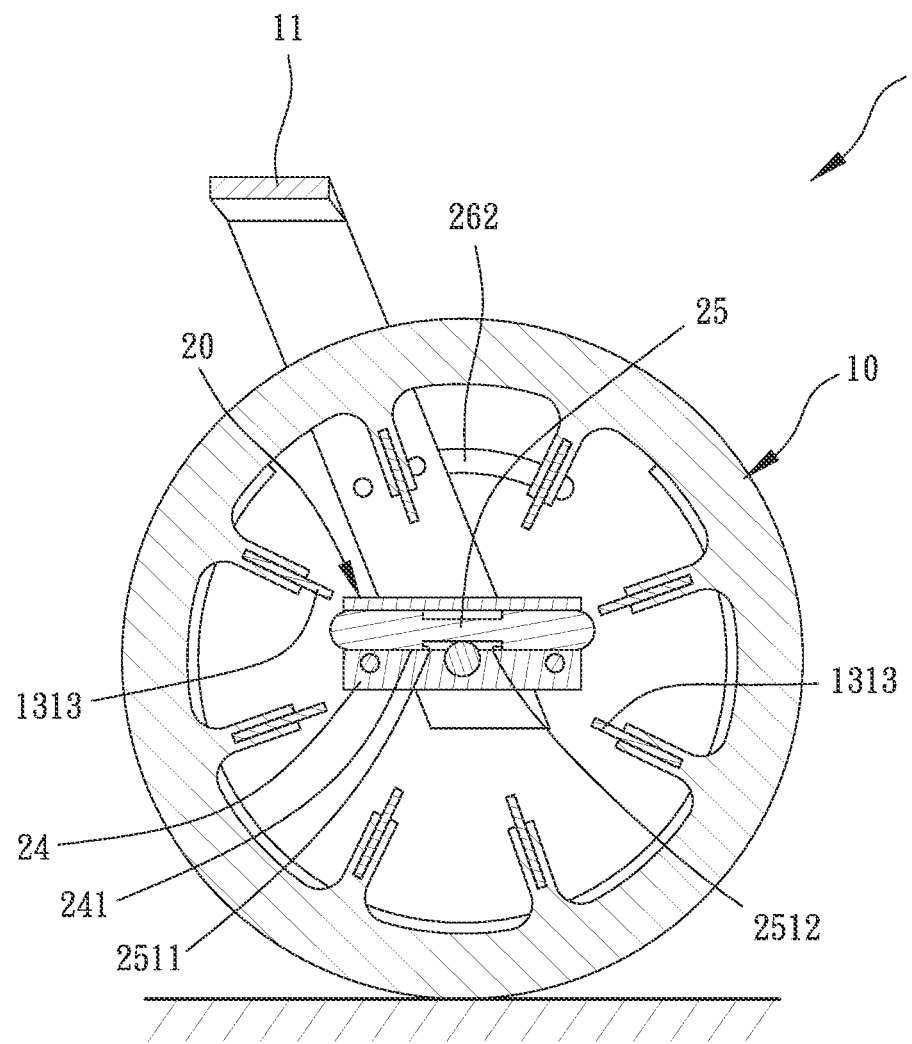
FIG. 11 is a sectional view in accordance with another embodiment of the present invention.

Referring to FIG. 9 to FIG. 11, the automatic speed reducing wheel 1 in accordance with another embodiment of the present invention is provided, comprising a wheel unit 10 and a speed reducing unit 20.

The wheel unit 10 comprises a wheel seat 11, a wheel axle 12 passing through the wheel seat 11, and a roller 13 rotating about the wheel axle 12. Two side boards 111 extend from the wheel seat 11, and a through hole 1111 passes through the two side boards 111, such that the wheel axle 12 passes through the through hole 1111. The roller 13 is disposed between the two side boards 111. The roller 13 comprises a wheel frame 131 whose outer periphery is combined with an outer wheel 132. The wheel frame 131 comprises an axle bore 1311 passing through the center thereof. The wheel axle 12 passes through the axle bore 1311. Therefore, the roller 13 is configured to freely rotate about the wheel axle 12. A plurality of elastic blockers 1313 is circularly disposed on one side of the wheel frame 131 in adjacent to an edge thereof in a radiation shape arrangement. The plurality of elastic blockers 1313 rotates along with the roller 13.

The speed reducing unit 20 comprises a fixing seat 24, a sliding member 25, and a side cover 26. The fixing seat 24 is disposed on one side of the roller 13. The fixing seat 24 comprises a sliding bore 241. The sliding member 25 is slidably disposed in the sliding bore 241. The sliding member 25 comprises a position limiting groove 251 disposed on the middle section thereof. The position limiting groove 251 allows the sliding member 25 to slide along the sliding bore 241 in a position limiting range. The sliding member 25 comprises a blocking portion 252 on the front end thereof. The side cover 26 is disposed on one side of the roller 13 and is combined with the fixing seat 24. The side cover 26 covers the fixing seat 21 and the sliding member 22, such that the sliding bore 241 of the fixing seat 24 is normally positioned in a horizontal arrangement. The side cover 26 comprises a through bore 261 passing through the center thereof, and the wheel axle 12 passes through the through bore 261. The side cover 26 comprises an arc bore 262, by which two screws 263 pass to be fastened on one of the side boards 111, whereby the side cover 26 is connected with the wheel seat 11, and the wheel seat 11 is able to sway with respect to the side cover 26 within the arc bore 262. Therein, the position limiting groove 251 comprises a first end 2511 and a second end 2512. The position limiting range is the interval range between the first end 2511 and the second end 2512.

Figure 12:
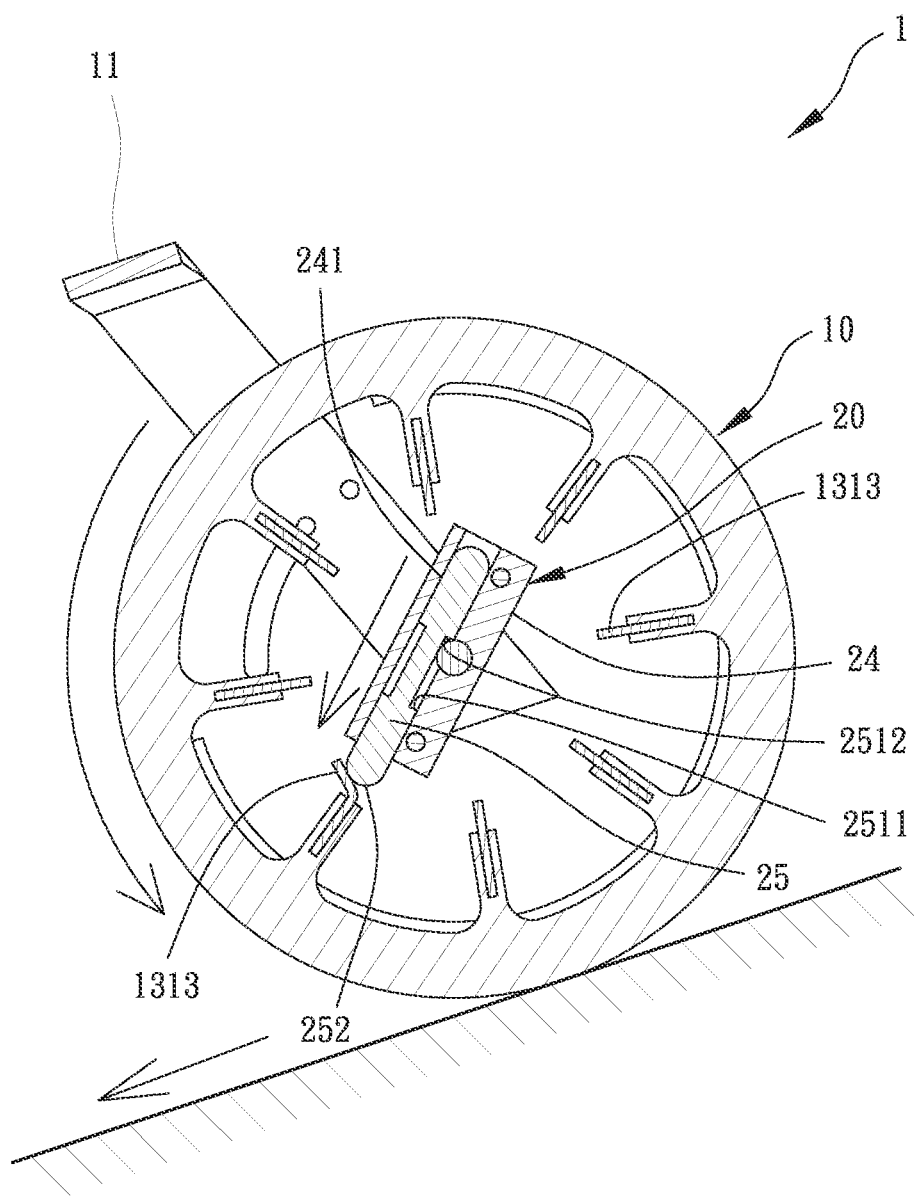
FIG. 12 is a schematic view illustrating the automatic speed reducing operation when moving downhill in accordance with another embodiment of the present invention.
Figure 13:
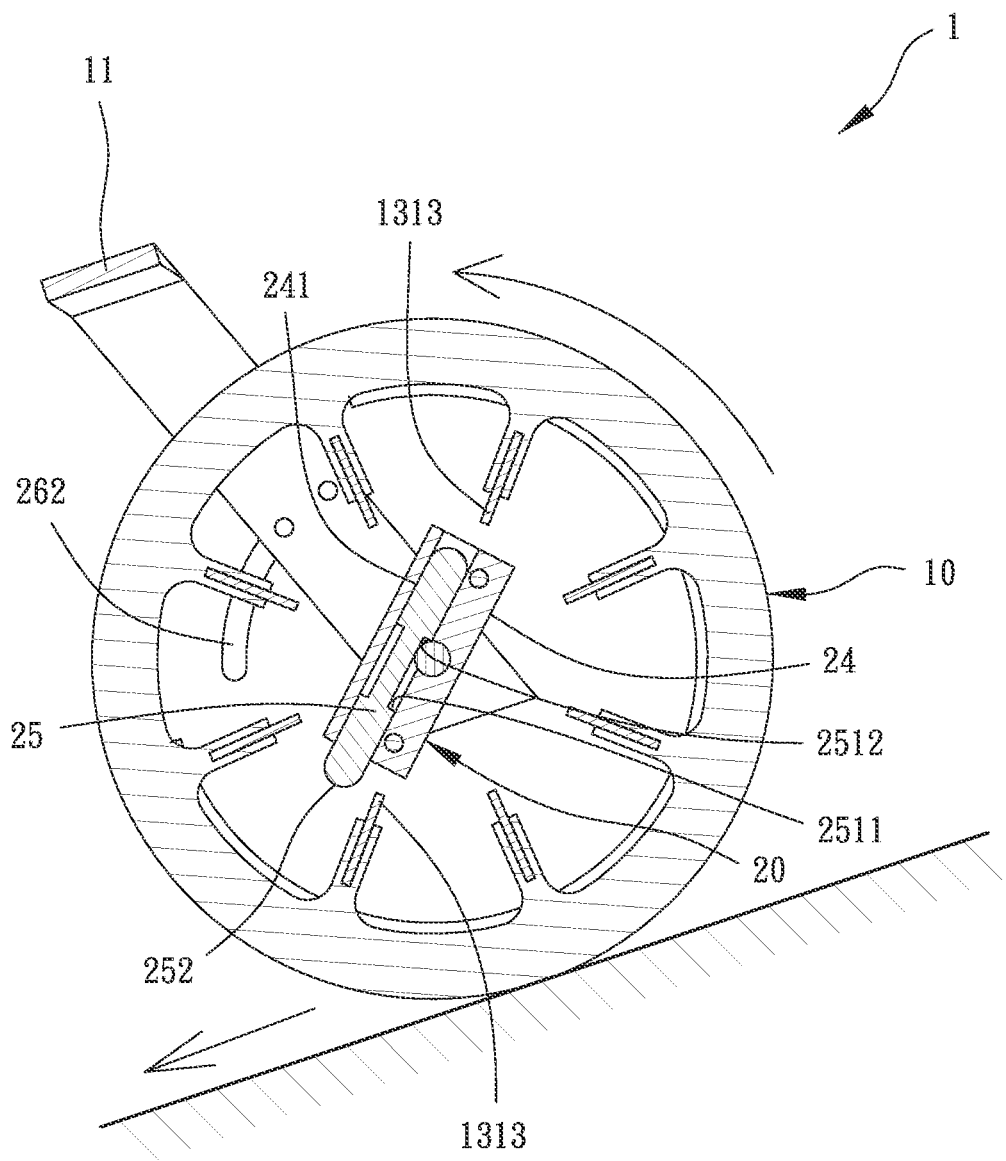
FIG. 13 is another schematic view illustrating the automatic speed reducing operation when moving downhill in accordance with another embodiment of the present invention.

In use, the automatic speed reducing wheel 1 is able to be installed on a moving vehicle such as a wheelchair 2 (as shown by FIG. 7) or a mobility aid 3 (as shown by FIG. 8). When the wheelchair 2 or the mobility aid 3 move on a level ground, the blocking portion 252 of the sliding member 25 is away from the rotation route of the plurality of the elastic blockers 1313 (as shown by FIG. 11), so that the wheelchair 2 or the mobility aid 3 is able to normally move. Referring to FIG. 12 and FIG. 13, when the wheelchair 2 or the mobility aid 3 moves downhill, the sliding bore 241 slants downward by an inclination angle. The sliding member 25 slides along the sliding bore 241 due to the effect of the gravity force, such that the blocking portion 252 of the sliding member 25 protrudes out of an outer side of the sliding bore 241 to interrupt the rotation route of the plurality of elastic blockers 1313, whereby the blocking portion 252 hinders the rotation of the plurality of elastic blockers 1313 with the elastic deformation and resilience of the elastic blockers 1313, so that the elastic blockers 1313 pass and hit the blocking portion 252 one by one and then recover, achieving a speed reducing effect.

Further, referring to FIG. 11 to FIG. 13, the position limiting groove 251 comprises a first end 2511 and a second end 2512, and the side edge of the wheel axle 12 is engaged with the position limiting groove 251. When the sliding bore 241 slants downward by an inclination angle, the second end 2512 of the position limiting groove 251 abuts against the side edge of the wheel axle 12, such that the sliding member 25 is able to move within the position limiting range, preventing the sliding member 25 from being separated from the sliding bore 241.

With the foregoing configuration, the present invention achieves following advantages.

The automatic speed reducing wheel 1 is able to be installed on a moving vehicle such as a wheelchair 2 or mobility aid 3. When the moving vehicle moves downhill, the present invention provides an automatic speed reducing function to avoid a sudden acceleration, thereby preventing the user from injury during the downhill movement and increasing the safety of the user.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An automatic speed reducing wheel, comprising:
  a wheel unit having a wheel seat, a wheel axle passing through the wheel seat, and a roller rotating about the wheel axle, the wheel seat comprising a through hole through which the wheel axle passes, the wheel axle comprising a non-circular section on one end thereof, the roller comprising a wheel frame whose outer periphery is combined with an outer wheel, the wheel frame comprising an axle bore passing through a center thereof, the wheel axle passing through the axle bore, the roller being configured to freely rotate about the wheel axle, a plurality of blockers disposed on one side of the wheel frame in adjacent to an edge thereof in a radiation shape arrangement, the plurality of blockers being configured to rotate along with the roller; and
  a speed reducing unit comprising a fixing seat and a sliding member, the fixing seat comprising a fixing bore and a sliding bore, the fixing bore mounted around the non-circular section of the wheel axle and fixed thereon, the fixing seat located on one side of the roller, the sliding member slidably disposed in the sliding bore, the sliding member comprising a sliding body, the sliding body comprising an elastic portion connected with a front end thereof, the elastic portion comprising a blocking portion connected with a front end thereof; when the roller moves downhill, the sliding bore slants downward by an inclination angle, and the sliding member slides along the sliding bore due to a gravity force, such that the blocking portion of the sliding member protrudes out of an outer side of the sliding bore to interrupt a rotation route of the blockers, whereby the blockers pass and hit the blocking portion one by one, such that a cooperation between the blocking portion and an elasticity of the elastic portion achieves a speed reducing effect.

2. The automatic speed reducing wheel of claim 1, wherein the wheel seat comprises two side boards extending therefrom; the fixing seat is disposed between the two side boards.

3. The automatic speed reducing wheel of claim 1, wherein the sliding bore is normally positioned in a horizontal arrangement.

4. The automatic speed reducing wheel of claim 1, wherein the elastic portion is formed in a sheet shape.

5. The automatic speed reducing wheel of claim 1, wherein the speed reducing unit comprises a protection cover; the protection cover is disposed on one side of the roller and covers the fixing seat and the sliding member; the protection cover comprises a combination bore passing through a center thereof, such that the combination bore is mounted around the non-circular section and fixed thereon.

6. An automatic speed reducing wheel, comprising:
  a wheel unit having a wheel seat, a wheel axle passing through the wheel seat, and a roller rotating about the wheel axle, the wheel seat comprising a through hole through which the wheel axle passes, the roller comprising a wheel frame whose outer periphery is combined with an outer wheel, the wheel frame comprising an axle bore passing through a center thereof, the wheel axle passing through the axle bore, the roller being configured to freely rotate about the wheel axle, a plurality of elastic blockers disposed on one side of the wheel frame in adjacent to an edge thereof in a radiation shape arrangement, the plurality of elastic blockers being configured to rotate along with the roller; and
  a speed reducing unit comprising a fixing seat and a sliding member, the fixing seat disposed on one side of the roller, the fixing seat comprising a sliding bore, the sliding member slidably disposed in the sliding bore, the sliding member comprising a blocking portion on a front end thereof; when the roller moves downhill, the sliding bore slants downward by an inclination angle, and the sliding member slides along the sliding bore due to a gravity force, such that the blocking portion of the sliding member protrudes out of an outer side of the sliding bore to interrupt a rotation route of the elastic blockers, whereby the blocking portion hinders the elastic blockers with an elastic deformation and resilience of the elastic blockers, so that the elastic blockers pass and hit the blocking portion one by one and then recover, achieving a speed reducing effect.

7. The automatic speed reducing wheel of claim 6, wherein the sliding member comprises a position limiting groove disposed on a middle section thereof; the position limiting groove allows the sliding member to slide along the sliding bore in a position limiting range.

8. The automatic speed reducing wheel of claim 6, wherein the sliding bore is normally positioned in a horizontal arrangement.

9. The automatic speed reducing wheel of claim 6, wherein the wheel seat comprises two side boards extending therefrom; the speed reducing unit comprises a side cover disposed on one side of the roller; the side cover is combined with the fixing seat, and covers the fixing seat and the sliding member; the side cover comprises a through bore passing through a center thereof, and the wheel axle passes through the through bore; the side cover comprises an arc bore, by which two screws pass to be fastened on one of the side boards, whereby the side cover is connected with the wheel seat, and the wheel seat is able to sway with respect to the side cover within the arc bore.

* * * * *